United States Patent [19]

Baker

[11] 4,106,157
[45] Aug. 15, 1978

[54] SWIMMING POOL SKIMMER AND THE LIKE

[76] Inventor: Thomas E. Baker, 4000 Davana Rd., Sherman Oaks, Calif. 91423

[21] Appl. No.: 821,769

[22] Filed: Aug. 4, 1977

[51] Int. Cl.² .............................................. B65D 25/28
[52] U.S. Cl. ....................................... 16/112; 210/470
[58] Field of Search .............. 16/110 R, 110.5, 111 R, 16/112, 114 R, 125, 126, 127; 210/465, 470, 169; 209/417, 418; 220/94 R, 95, 96; 224/33, 28, 27 H

[56] References Cited

U.S. PATENT DOCUMENTS

| | | | |
|---|---|---|---|
| 1,692,110 | 11/1928 | Cave et al. | 403/212 |
| 1,990,957 | 2/1935 | Ridges | 16/110 R |
| 2,123,813 | 7/1938 | Stiles | 16/111 R |
| 2,362,720 | 11/1944 | Reichart | 220/94 R |
| 2,486,163 | 10/1949 | Jennings et al. | 16/110.5 |
| 2,511,160 | 6/1950 | Grobowski | 16/114 R |
| 2,532,052 | 11/1950 | Berman | 210/161 |
| 2,651,878 | 9/1953 | Webbekind | 16/110 R |
| 2,706,664 | 4/1955 | Conrad | 306/45 |
| 2,783,573 | 3/1957 | Rau | 43/11 |
| 3,220,037 | 11/1965 | Ruhling | 15/1.7 |
| 3,243,020 | 3/1966 | Friedlander | 16/125 |
| 3,368,686 | 2/1968 | Petrik | 210/407 |
| 4,052,319 | 10/1977 | Friedman | 210/465 |

Primary Examiner—William A. Cuchlinski, Jr.
Assistant Examiner—Jon E. Hokanson
Attorney, Agent, or Firm—Jay H. Quartz

[57] ABSTRACT

In a preferred embodiment, a self-returning hinge is embodied in an appliance or tool comprising a tubular handle and an open frame formed from a flexible spring metal into a desired shape and having a pair of U-shaped end sections extending laterally outwardly therefrom in mutually overlying relation into a hollow end section of the handle which is crimped along one side thereof with the opposite side being flattened to retain the U-shaped end sections therein in such overlying relation. Various elements such as nets, brushes, and scrapers may be attached to the frame as desired.

Other embodiments which do not provide a self-returning hinge are also described; however, such embodiments do provide certain other advantages also associated with the preferred embodiment. In one other embodiment, the frame is made from a non-spring metal and in a second other embodiment, the referenced hollow end section is crimped along two opposing sides and the frame is made from a non-spring metal.

14 Claims, 6 Drawing Figures

SWIMMING POOL SKIMMER AND THE LIKE

BACKGROUND OF THE INVENTION

This invention relates to hand-manipulated, handled devices or tools having a working end subject to substantial loading forces. More specifically, the described invention relates particularly to long-handled devices such as swimming pool skimmers and the like.

To clean areas or places which are not readily accessible to a person, such as swimming pools filled with water, it is necessary to utilize long-handled devices or appliances such as skimmers, brushes, scalers, etc. The working ends of these devices are often subjected to substantial loading. For example, commercial swimming pool skimmers may retrieve single loads of debris weighing 18 kg. (40 lb.) to 27 kg. (60 lb.). Forces produced by such loads may permanently deform the working end, break it off from its handle or break the handle. Additionally, the dead weight effect of the forces to which these devices are subjected can (and do) adversely affect the ability of a worker to manipulate the presently-available devices.

When utilizing the described appliances, it is often desirable to be able to manipulate the handle so that the working end can be bent away from its normal plane (without distorting the working end itself) to provide a scraping action or to maneuver the working end around corners, over curved surfaces, etc. Unfortunately, even a few bendings often result in breaking the frame.

It is also desirable that the working end return to its normal plane after being displaced therefrom by a worker (or by loads to which it may be subjected) so that substantially no permanent set is produced in the appliance material even after numerous bendings. When the frame does not return to its normal plane, the worker must take the time to apply sufficient pressure to force it to do so.

Numerous designs for swimming pool appliances have been made and used — some with greater success than others. However, there are presently no such appliances which can satisfy the previously-discussed problems. This is particularly true in the commercial field where these problems are magnified due to the greater use (and abuse) to which these appliances are subjected.

Various designs and constructions are disclosed in the following U.S. Pat. No. 3,368,686, issued Feb. 13, 1968, entitled "Swimming Pool Scoop and Skimmer"; No. 3,220,037, issued Nov. 30, 1965, entitled "Swimming Pool Cleaning Equipment"; and No. 2,706,664, issued Apr. 19, 1955, entitled "Handle Mounting for Net Frames."

U.S. Pat. No. 3,368,686 describes a swimming pool skimmer which includes a loop having a pair of radially-extending ends inserted in parallel into one end of a tubular handle and held therein by fasteners or other suitable means. Depending upon the thickness of the loop material, the loop either cannot be bent about its ends out of its normal plane or, if it can be so bent, it will break after relatively few such bendings because the connection between the handle and the loop does not provide sufficient flexibility and strength to absorb the stresses of multiple bending. Additionally, the disclosed connection presents manufacturing and assembly problems if a fastener is required. If the loop ends are retained in the handle by crimping the latter without using fasteners, those ends are subject to being pulled out during use.

U.S. Pat. No. 3,220,037 discloses a swimming pool skimmer in which the handle is rigidly connected to a flat ring structure by a press-fitted plug which serves to wedge parallel ends of the ring in the tubular handle. The resulting rigid assembly resists bending movement of the ring structure away from its normal plane. Additionally, if sufficient force is exerted to bend the frame away from its normal position, the frame will break.

U.S. Pat. No. 2,706,664 discloses a swimming pool skimmer in which the net-supporting frame is connected to a handle through a cast head at one end thereof. Free ends of the frame when in place extend through the sides of the head and are bent at right angles into longitudinal parallel relation to each other. They are retained in that position by removable, sleeve-type keys. The resulting connection (between frame and handle) is relatively stiff even though the frame may be formed from spring wire. Although the described assembly provides for relatively easy assembly and disassembly and even though it permits some bending of the frame away from its normal position, it does not have significant memory (returnability) and the frame will break after relatively few bendings so that replacement of the frame then becomes necessary. Additionally, the described assembly requires substantial close tolerance machining which can be expensive.

Another swimming pool skimmer design which has been manufactured for a number of years comprises a generally rectangular frame which may be made from spring wire and which has aligned ends held in place within a casting (connected to a handle) by rivets. This design resists bending of the frame and, if subjected to sufficient bending force, will break.

As will be understood from the foregoing discussion of the prior art, there remains a need for a hinge which will interconnect a working element and a handle to permit bending of the former at the hinge so that the working element can be bent away from or urged out of its normal plane, yet which will return the working element to its normal plane when the bending forces are removed. At present, it is estimated that up to 80% of the swimming pool skimmer market constitutes replacement skimmers for those which have broken (usually as the result of an inability to withstand bending forces).

SUMMARY OF THE INVENTION

The preferred embodiment of the described invention is embodied in a structure for connecting a working element such as a net to a handle to provide a spring hinge. More specifically, the end sections of a discontinuous frame associated with a working element and made from a resilient material are formed into U-shapes, placed in overlying relation to each other, and caused to be held in such overlying relation by first inserting those end sections into one end of a tubular handle and thereafter crimping the latter about the frame end sections along one side of the handle with the opposite side being flattened.

The resulting structure has several advantages. Most importantly, it produces a hinge which permits hundreds of bendings of a frame about such hinge and away from its normal planar position, but which returns the frame to the latter position after each displacement therefrom. Such hinge enables a working element to be used like a shovel, permits the lifting of relatively heavy weights without breaking the handle, and serves to "liven" a weight so that it can be more easily handled by a worker. Such advantages are believed to result from the ability of the described hinge to absorb forces applied to the working element rather than transmitting all of such forces to the handle thereby preventing handle breakage and eliminating the "dead weight" feeling transmitted by appliances having solid connections between working element and handle.

Other advantages of the described structure are that it is of relatively simple construction, easily assembled, and relatively inexpensive. Additionally, the use of fasteners and related machining is eliminated.

Other embodiments of the invention are described herein which do not provide the returnable-hinge feature of the preferred embodiment. However, they are characterized by ease of construction and by an ability to fixedly retain the frame in the handle. One such embodiment is structurally the same as the preferred embodiment except that a non-spring metal is used to form the frame whereas, in a second such embodiment, the handle is crimped along both sides to retain the U-shaped frame end sections therein and the frame material is also made from non-spring metal.

DESCRIPTION OF THE PREFERRED EMBODIMENT

The preferred embodiment of the herein-described invention is embodied in a flexible hinge structure for interconnecting a working element, such as a skimmer or scoop net, and a handle utilized to manipulate the working element.

Turning now to the Figures, the preferred embodiment will be described first with particular reference to FIGS. 1 and 2 in which the numeral 10 designates a swimming pool skimmer comprising a handle 12 and a skimmer 14.

Figure 1:
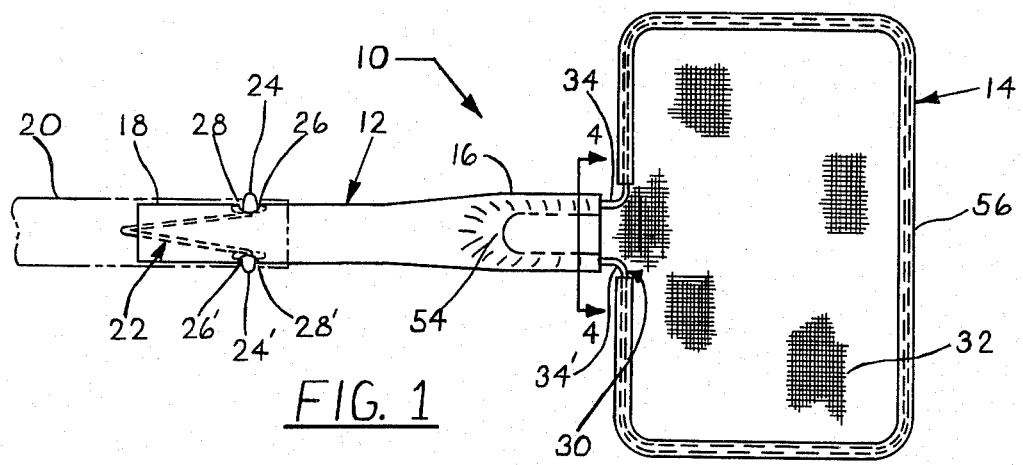
FIG. 1 is a top plan view of a swimming pool skimmer embodying the herein-described preferred embodiment of the invention.
Figure 2:
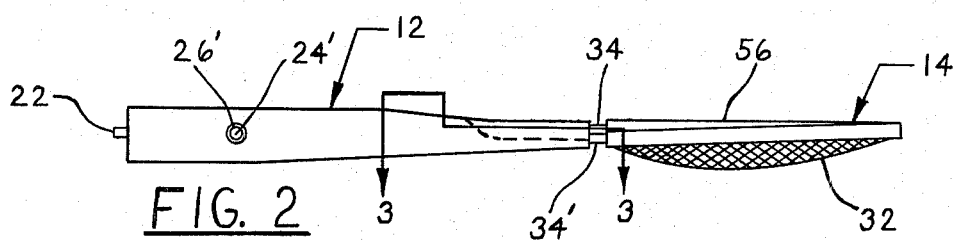
FIG. 2 is a side elevational view of the swimming pool skimmer of FIG. 1 (without the handle extension).

The handle 12 is a hollow tubular member which may be a full length handle or it may be a short length of tubing as shown in FIGS. 1 and 2 to which an additional length of tubing may be suitably attached to provide the desired handle length. Unless otherwise indicated, as used herein and in the claims, the term "handle" refers both to a full-length handle and to the short length of tubing to which extension(s) may be added as shown in FIGS. 1 and 2.

The handle 12 shown in FIGS. 1 and 2 has a first or working end section 16 which is adapted to receive the skimmer 14 as will be described hereinafter and a second or connector end section 18 for connection to a tubular extension 20 (shown in phantom line in FIG. 1) to provide the desired handle length. Connection of the handle 12 to an extension may be made by any suitable means. For example, a standard V-shaped spring clip 22 having a pair of detents 24, 24' projecting outwardly from the free ends thereof may be disposed within the connector end section 18 so that the spring-urged locking detents extend radially outwardly through a pair of aligned apertures 26, 26' respectively, defined by the connector end section 18 along a diameter thereof. The handle extension 20 may be slipped over the depressible locking detents 24, 24' to snap the latter into locking position in aligned openings 28, 28', respectively, defined by the handle extension. Additional lengths of tubing can be added in the same manner as described with respect to the first extension 20 until the desired length of the handle is produced.

The handle 12 is preferably made from aluminum because of its lightness and preferably has a relatively thin wall to facilitate clamping of the handle against the frame 14 as described hereinafter. A particularly useful handle may be made from 6061T6 aluminum having an I.D. of 2.54 cm. (1 in.) and a 1.47 mm. (0.058 in.) wall thickness.

The skimmer 14 comprises an open frame 30 formed into a desired shape with a net 32 suitably attached thereto and depending therefrom (as viewed in FIG. 2). The frame 30 is formed from a resilient flexible metal which (because of its physical characteristics and diameter) can be bent into any desired frame shape, but which will retain that shape during normal skimmer use. Additionally, the selected frame metal must be capable of being bent by a workman utilizing the swimming pool skimmer 10. A particularly useful metal is spring wire such as MB 1065 steel spring wire having a diameter of about 4.88 mm. (0.192 in.). This material can be flexed using hand pressure and meets Federal Specification No. QQW428 (ultimate tensile strength 15,000 – 17,000 kg./cm$^2$) (215,000 – 240,000 psi).

Figure 3:
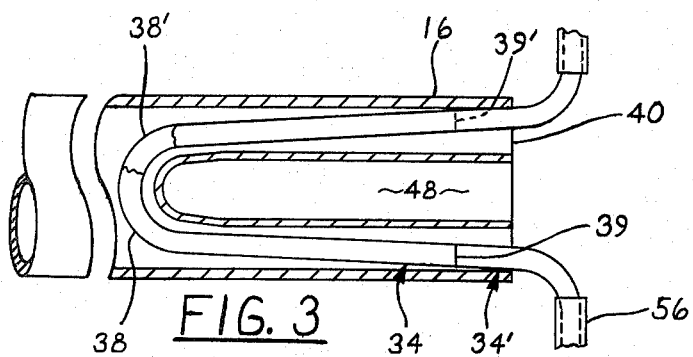
FIG. 3 is a partial sectional view of the skimmer frame-retaining end section of the skimmer handle of the skimmer of FIG. 1 taken in the direction of the arrows 3—3 of FIG. 2.

When the frame 30 is separate from the swimming pool skimmer 10, it is discontinuous, but is effectively made continuous by its method of attachment to the handle 12. The frame 30 has a pair of end sections 34, 34' extending laterally outwardly therefrom and formed to define U-shaped configurations. For ease of manufacture and function, the U-shaped end sections 34, 34' are preferably made substantially identical to each other. Each of the end sections 34, 34' comprises a pair of legs 35, 36 and 35', 36', respectively, interconnected by a curved intermediate section 38, 38', respectively. One leg 35, 35' of each U-shaped end section 34, 34' terminates in a free end 39, 39', respectively. The width (including material diameter) of each U-shaped end section 34, 34' along at least a portion of the length of each such end section is preferably at least equal to the inside diameter of the handle 12 so that a friction or force fit exists between U-shaped end sections and handle as shown in FIG. 3 wherein the letter "W" generally represents the maximum width of the U-shaped end sections when inserted in the handle. The relative dimensioning of U-shaped end sections 34, 34' and handle 12 facilitates locking of the frame 30 in the handle by preventing wobble of the U-shaped end sections within the handle.

Figure 4:
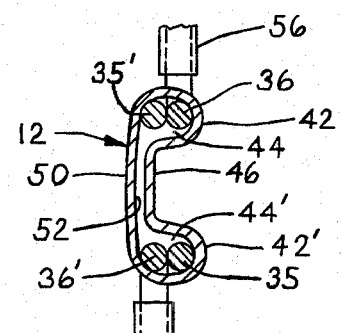
FIG. 4 is an elevational sectional view taken along the line 4—4 of FIG. 1.

Prior to joinder of the frame 30 with the handle 12, the U-shaped end sections 34, 34' are positioned in mutually overlying position, i.e., overlying relative to each other as viewed at right angles to the plane of the frame. In this position, they are inserted into the working end section 16 of the handle 12 through the open end 40 thereof (FIG. 3 and 4). The U-shaped end sections 34, 34' are locked in their aforementioned mutually overlying position by crimping or creasing the working end section 16 along one "side" thereof while simultaneously flattening the diametrically opposite "side" of the working end section. In this way, a pair of longitudinal ridges 42, 42' defining longitudinal bores 44, 44', respectively, and elevated relative to a depressed, generally U-shaped and flat wall 46 having an exposed or outer surface 48 and extending therebetween are formed in the one "side" of the handle 12, whereas a generally flat wall 50 (which may be slightly angled upwardly toward the wall 46) is formed in the other or underlying (as viewed in FIG. 2) "side" of the handle. The underlying U-shaped end section, e.g., 34', rests upon and is supported by the inner surface 52 of the underlying wall 50 and the legs 35, 35', 36, 36' of the frame end sections extend along the bores 44, 44' in mutually overlying relation. Retention of the U-shaped end sections 34, 34' within the handle 12 is effected by abuttment of the curved closed ends 38, 38' of those end sections against the inner surface of a curvilinear wall section 54 of the handle formed during the crimping operation and extending between the depressed handle wall 46 and the uncrimped handle wall.

As shown in FIG. 3, each U-shaped end section 34, 34' overlies the other U-shaped end section 34', 34 along substantially its entire length within the working end section 16 and the free ends 39, 39' of the U-shaped end sections are disposed adjacent to the open end 40 of the handle 12. In this way, forces acting through the resulting hinge are distributed substantially uniformly across it to prevent asymmetrical force concentrations which could adversely affect operation of the hinge and lead to breakage.

The net 32 may be made from any suitable netting material such as, for example, a vinyl chloride-vinylidene chloride copolymer such as Saran. Attachment of the net 32 to the frame 30 may be made in a number of ways including stringing the net along the frame. A particularly useful way is to form a frame cover or sleeve 56 from thin gauge metal, e.g., 0.56 mm. (0.022 in.) tempered steel, by first forming the latter into a tube having a generally "C" transverse cross-sectional configuration, shaping the sleeve 56 to conform it to that of the the frame 30, inserting the edges of the net 32 between confronting lips or edges of the sleeve, and pressing the sleeve over the frame while pressing the confronting lips of the sleeve into clamping contact with the netting.

Instead of attaching a net to the frame, other working elements may be conventionally attached thereto as, for example, brushes, scrapers, etc. However, use of each of the latter would benefit from the presence of the described hinge.

Figure 5:
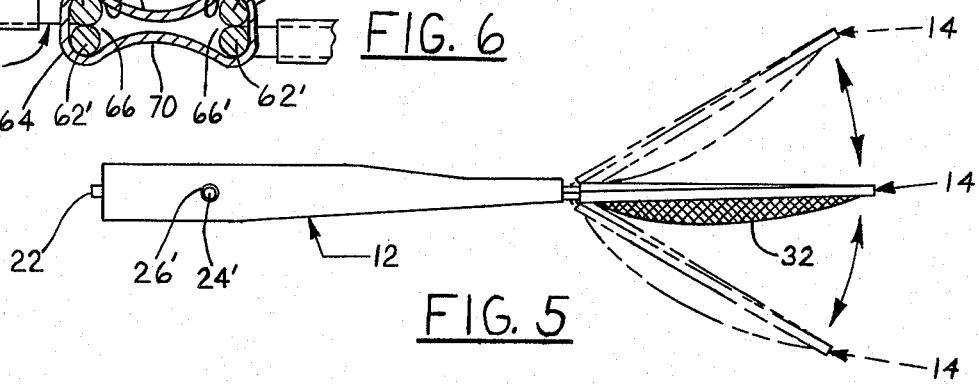
FIG. 5 is a side elevational view of the swimming pool skimmer shown in FIG. 1 (without the handle extension) illustrating the flexibility of the described spring hinge.

When assembled as described, the components of the preferred embodiment provide a resilient or spring hinge which permits significant displacement of the skimmer 14 (phantom line in FIG. 5) from its normal planar alignment with the handle 12 (solid line in FIG. 5) as shown by the arrows in FIG. 5. In addition to permitting such displacement or bending to occur, the described hinge returns the skimmer to its normally planar position after each displacement therefrom. Additionally, the described hinge structure prevents the frame from pulling out of the handle and secures it against wobble within the latter. These characteristics of the hinge are believed to result from a combination of factors, namely: the flexible spring metal, the overlying disposition of the frame end sections 34, 34' within the handle 12 adjacent to one end thereof, the U-shaped configuration of the frame ends which provide substantial and symmetrical overlap of the frame ends within the handle, and the presence of an underlying flat supportive handle surface for the U-shaped end sections (combined with a crimped upper handle surface).

In another embodiment of the invention, the structure is identical to that described hereinbefore with respect to the preferred embodiment. However, instead of forming the frame from a resilient material such as spring steel, one can form the frame from, e.g., aluminum rod, which can be bent to the desired frame shape, but which will break if subjected to multiple bendings. The resulting embodiment does not provide a self-returnable hinge (as does the preferred embodiment), but it is readily assembled, is relatively inexpensive to produce, and ensures secure locking of a frame in its handle without wobble. As such, it would be quite satisfactory for the homeowner swimming pool market where it would be normally subjected to less use and loading than in the commercial user field.

Figure 6:
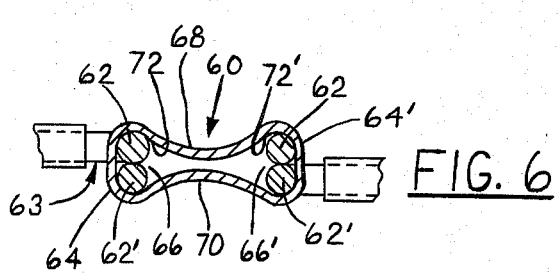
FIG. 6 is an elevational sectional view similar to that of FIG. 4 except that it represents the cross-section of a handle of another embodiment of the invention.

Still another embodiment is similar to the preferred embodiment structure except that the handle is crimped along both "sides" of its working end section to anchor the U-shaped frame end sections therein. By crimping along both sides, a handle configuration is produced which differs from that of the preferred embodiment as shown by comparing FIG. 4 with FIG. 6. As can be seen in FIG. 6, a handle 60 is crimped along opposing sides after a pair of U-shaped end sections 62, 62' of a frame 63 have been inserted therein in overlying relation to form a pair of longitudinal receptacles or sockets 64, 64' defining a pair of longitudinal bores 66, 66', respectively, and separated by opposing, generally U-shaped depressed walls 68, 70. In this embodiment, the legs of both U-shaped end sections 62, 62' lie against interior curved surfaces 72, 72', of the longitudinal receptacles 64, 64', respectively, in contrast to the preferred embodiment in which one of the U-shaped end sections lies against a flat surface. This difference (without further modification) results in significant wobble or looseness of the frame with respect to the handle in this other embodiment because the double-crimped structure (as again contrasted with the preferred embodiment) permits the U-shaped frame end sections to move out of the aforedescribed overlying relation with each other. To overcome this problem, a modification is made by which thicker material is used for the frame to better fill the bores 66, 66'. For example, diameters of the frame material, e.g., steel or aluminum, on the order of 50% or more greater than that utilized in the preferred embodiment would have to be used. Such modification results in a loss of resilience and flexibility in the hinge so that a spring hinge is not produced as it is in the preferred embodiment. However, this structure does provide substantially the same advantages as are provided by the other alternate embodiment.

The described invention will be further described by the following Examples.

EXAMPLE 1

A swimming pool skimmer was made substantially as described and shown in FIGS. 1-4. The skimmer frame was made from MB 1065 steel spring wire with a diamter of 4.88 mm. The handle (with extension) was about 1.5 meters long and was made from 1.47 mm. (0.058 in.) thick 6061T6 aluminum and had an inner diameter of 2.54 cm. (1 in.). The ends of the frame were formed into U-shapes having an inner length of 6.35 cm. (2.5 in.) and an inner width of 2.54 cm. (1 in.).

After assembly, the appliance was subjected to repeated bendings as shown in FIG. 5. That is, it was placed against a floor and pressure was applied through the handle to cause the frame to bend out of its normal plane. That pressure was then released and the frame was allowed to spring back to its normal position. The appliance was then turned over and the foregoing pressure applied/pressure released steps were repeated. After more than a thousand such bendings, the resilient, flexible hinge continued to function effectively.

EXAMPLE 2

The same structure (and materials) as described in Example 1 was made except that the handle was crimped along opposing sides to retain the U-shaped ends of the frame therebetween.

This structure provided resilient hinge action between frame and handle; however, the frame was so loose in the handle (although it could not be pulled out) that the appliance would not be saleable.

EXAMPLE 3

This example illustrates the necessity of using a sufficiently thicker frame to eliminate the wobble (noted in Example 2 above) associated with the diametrically crimped embodiment shown in FIG. 6. It further illustrates the loss of a resilient hinge as a result of correcting the wobble problem.

A structure was made as described in Example 2 except that 6.35 mm. (0.25 in.) stainless steel rod was used for the frame. This material was bendable into the desired shape (essentially a square) and was resilient.

Although the finished structure provided a satisfactory lock between handle and frame, it did not provide a resilient (i.e., self-returnable) hinge.

From the foregoing description, it will be evident that there has been described an appliance comprising a handle and a resilient frame connected thereto by a self-returnable, i.e., resilient, hinge capable of being bent hundreds of times without breaking. As noted, various working elements such as nets, brushes, etc., may be attached to the frame to provide a number of devices useful for cleaning difficult-to-reach areas such as swimming pools. The resilient hinge is obtained by inserting U-shaped end sections of the frame into the handle in mutually overlying relation and compressing the handle so that a crimped (wavy) wall and an opposing flat wall are produced in the handle with one of the U-shaped end sections resting against the inner surface of the flat wall to thereby lock the frame against relative movement within the handle. In the preferred embodiment, the frame is made from a material which is bendable into desired frame shapes, but which is resilient (due to its physical characteristics and dimensions). In an alternate embodiment utilizing the same structure, the frame material is not resilient (again because of its physical characteristics and/or its thickness); however, the resilient hinge connection of handle to frame is thereby lost. In another alternate embodiment, the handle can be crimped along opposing sides, but a thicker frame has to be used to prevent looseness of the handle relative to the frame and this again causes loss of the resilient hinge.

I claim:

1. An appliance comprising:
   a handle having at least one hollow end section, said handle being compressed along said one hollow end section to form a crimped wall and an opposing generally flat wall having an inner surface; and
   a resilient frame having a pair of U-shaped end sections extending laterally outwardly therefrom and disposed within said one hollow end section in mutually overlying upon one another with one of said U-shaped end sections lying against said inner surface of said flat wall, said frame being locked against movement within to said handle by the compression of said handle against said U-shaped end sections.

2. The appliance of claim 1 which further comprises:
   a working element; and
   attachment means for attaching said working element to said frame.

3. The appliance of claim 2 wherein said working element is a net.

4. The appliance of claim 1 wherein said handle is compressed along said hollow end section to form said crimped wall and to form an opposing second crimped wall, said U-shaped end sections having a thickness sufficient to prevent relative movement of said frame within said handle.

5. The appliance of claim 4 wherein said appliance further comprises:
   a working element;
   attachment means for attaching said working element to said frame.

6. The appliance of claim 1 wherein the width of said U-shaped end sections is substantially equal to the inside diameter of said one hollow end section along at least a portion of the length of each said U-shaped end section to provide a force fit between said frame and said handle.

7. An appliance comprising:
   a tubular handle compressed along a first end section to form therealong a crimped wall and an opposing generally flat wall having an inner surface;
   a resilient frame having a pair of U-shaped end sections extending laterally outwardly therefrom and disposed within said first end section of said handle in mutually overlying relation upon one another with one of said U-shaped end sections resting against said inner surface of said flat wall, each said U-shaped end section being sized to provide a force fit between said handle and said U-shaped end sections, said frame being locked against movement within to said handle by compression of said handle against said U-shaped end sections;
   a working element; and
   attachment means for attaching said working element to said frame.

8. The appliance of claim 7 wherein said handle has a second end section and wherein said appliance further comprises:
   a handle extension;
   connector means mounted along said second end section for releaseably connecting said handle extension to said handle.

9. The appliance of claim 7 wherein said first end section of said handle is compressed to form said crimped wall and to form a second opposing crimped wall, said U-shaped end sections having a thickness sufficient to prevent relative movement of said frame within said handle.

10. An appliance comprising:
- a tubular handle compressed along one end section thereof having a free end to form therealong a crimped wall and an opposing generally flat wall having an inner surface;
- a resilient frame having a pair of substantially identical U-shaped end sections extending laterally outwardly therefrom and disposed within said one end section of said handle in mutually overlying relation upon one another with one of said U-shaped end sections resting against said inner surface of said flat wall, each said U-shaped end section of said frame having a free end disposed adjacent to said free end of said one end section of said handle a spaced distance from the other of said free ends of said U-shaped end sections and having a width sufficient to provide a force fit between said handle and said U-shaped end sections, said frame being locked to said handle by compression of said handle against said U-shaped end sections;
- a working element; and
- attachment means for attaching said working element to said frame.

11. The appliance of claim 10 wherein said working element is a net.

12. The appliance of claim 10 wherein said one end section of said handle is compressed to form said crimped wall and to form an opposing second crimped wall, said U-shaped end sections having a material thickness sufficient to prevent relative movement of said frame in said handle.

13. An appliance comprising:
- a handle having at least one hollow end section, said handle being compressed along said one hollow end section to form a crimped wall and an opposing generally flat wall having an inner surface; and
- a substantially non-resilient frame having a pair of U-shaped end sections extending laterally outwardly therefrom and disposed within said one hollow end section in mutually overlying relation upon one another with one of said U-shaped end sections lying against said inner surface of said flat wall, said frame being locked against movement within said handle by the compression of said handle against said U-shaped end sections.

14. The appliance of claim 13 wherein said appliance further comprises:
- a working element; and
- attachment means for attaching said working element to said frame.

* * * * *

UNITED STATES PATENT AND TRADEMARK OFFICE
CERTIFICATE OF CORRECTION

PATENT NO. : 4,106,157
DATED : August 15, 1978
INVENTOR(S) : BAKER, Thomas E.

It is certified that error appears in the above-identified patent and that said Letters Patent are hereby corrected as shown below:

Column 8, line 12, after "overlying" insert --relation--;

lines 15 and 54, delete "to" on each line.

Signed and Sealed this

Nineteenth Day of February 1980

[SEAL]

Attest:

SIDNEY A. DIAMOND

Attesting Officer

Commissioner of Patents and Trademarks